United States Patent [19]
Hasler

[11] Patent Number: 5,935,435
[45] Date of Patent: Aug. 10, 1999

[54] PAINT CAN STRAINER

[76] Inventor: James J. Hasler, 50 Donna La., Forestville, Conn. 06010

[21] Appl. No.: 09/063,168

[22] Filed: Apr. 20, 1998

[51] Int. Cl.[6] .............................. B01D 29/31; B01D 29/33
[52] U.S. Cl. .......................... 210/232; 210/473; 210/474; 210/497.01; 210/469
[58] Field of Search .................................. 210/232, 474, 210/473, 464, 469, 497.01

[56]         References Cited

U.S. PATENT DOCUMENTS

| | | |
|---|---|---|
| 2,250,646 | 7/1941 | Metsch . |
| 2,471,189 | 5/1949 | Bartels . |
| 2,606,694 | 8/1952 | Galletta . |
| 2,625,270 | 1/1953 | De Armas . |
| 4,946,591 | 8/1990 | Mealey . |
| 5,186,828 | 2/1993 | Mankin . |
| 5,202,021 | 4/1993 | Griffin et al. . |
| 5,221,475 | 6/1993 | Mealey et al. . |
| 5,250,179 | 10/1993 | Spearman . |
| 5,308,485 | 5/1994 | Griffin et al. . |
| 5,368,728 | 11/1994 | Reaves . |
| 5,384,046 | 1/1995 | Lotter et al. . |
| 5,417,906 | 5/1995 | Chiodo . |
| 5,453,189 | 9/1995 | Joergensen . |
| 5,549,826 | 8/1996 | Lapoint, Jr. . |
| 5,593,587 | 1/1997 | Fumihiko . |

FOREIGN PATENT DOCUMENTS

| | | |
|---|---|---|
| 29705041 | 8/1997 | Germany . |
| 755614 | 8/1956 | United Kingdom . |

*Primary Examiner*—Thomas M. Lithgow
*Attorney, Agent, or Firm*—McCormick, Paulding & Huber

[57]         ABSTRACT

Three versions of paint can strainers share common features, including an annular adaptor fitted to the top of a paint can and a cup-shaped filter carried by the adaptor so as to be pushed down into a partially full paint can to a position where it is supported by the adaptor from the paint can lid. Paint previous screening allows the paint, but not particles of hardened paint, or other impurities, to pass into the cupshaped filter. A wipe edge may be provided on the inside edge of the adaptor. A pour spout might also be molded into the adaptor.

7 Claims, 3 Drawing Sheets

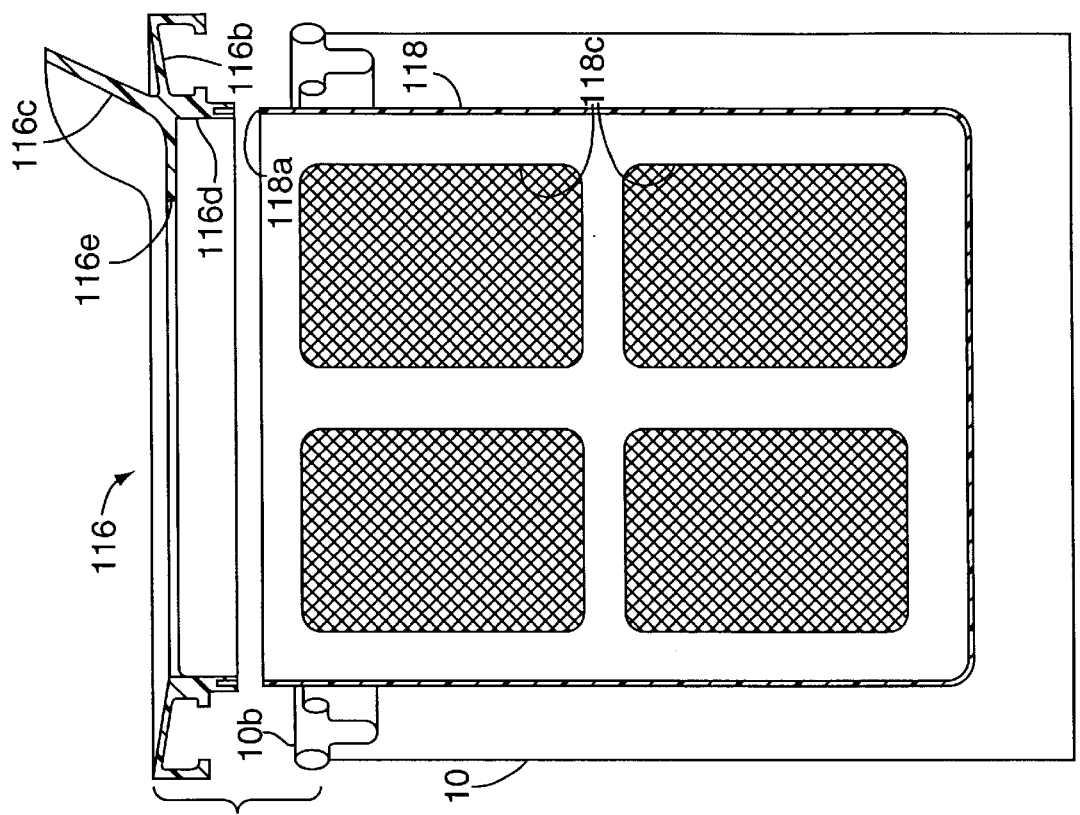
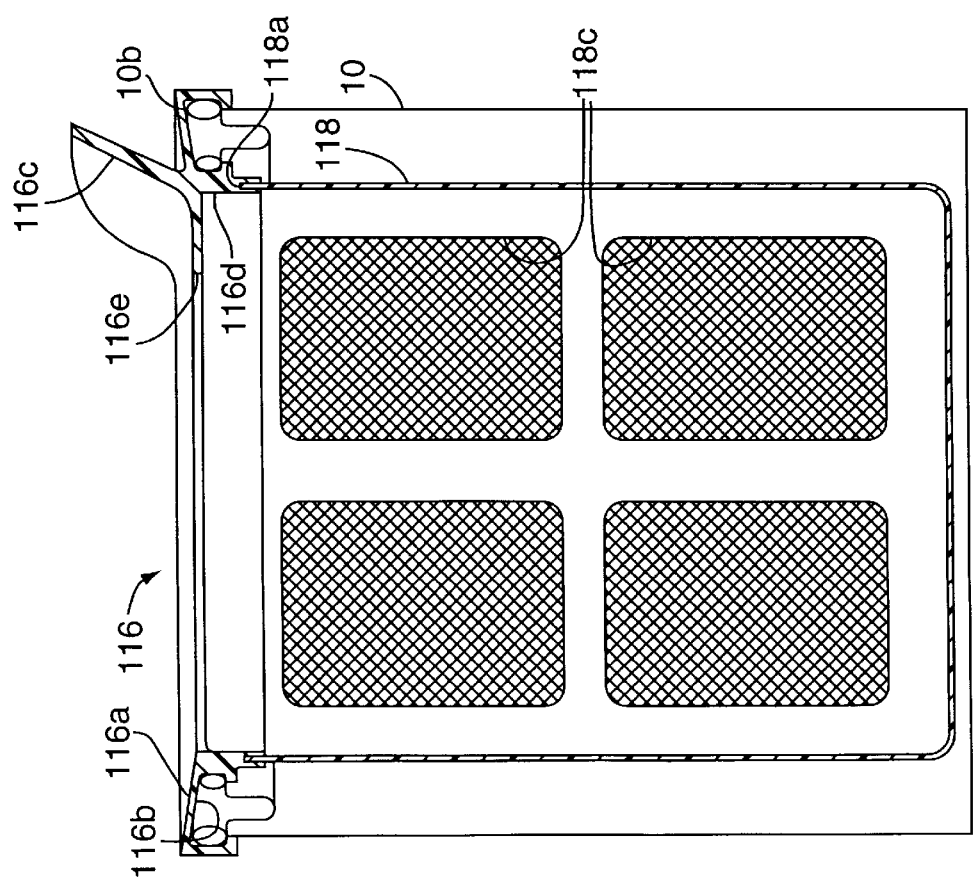

PAINT CAN STRAINER

FIELD OF THE INVENTION

This invention relates generally to strainers of the type used with a paint can, and deals more particularly with a strainer that is especially suited for use with a partially filled paint can. More particularly, the paint can strainer is intended for use after the paint can is reopened so that subsequent use of the paint is not impeded by the formation of a skin of paint inside the can which, although removed, nevertheless will result in some dried paint particles remaining in the paint.

SUMMARY OF THE INVENTION

The paint strainer of the present invention is intended for use with a typical paint can having an annular groove in the paint can rim. The strainer of the present invention includes an annular adapter having an upper radially outwardly extending rim which covers the annular groove in the paint can rim. The adapter includes a depending annular flange which is of appropriate diameter so as to fit inside the paint can rim, and further includes a depending paint straining filter which is of cylindrical shape corresponding to that of the can, but fitting inside the can. An upper annular edge of the filter is received in an annular slot, provided for this purpose, in the lower marginal edge of the depending adapter flange. The filter is upwardly open and preferably fabricated from a cardboard or a celluosic material with sufficient stiffness to permit insertion of the strainer inside the partially full paint can.

The upper marginal edge of this cardboard filter is received in a downwardly open slot, provided for this purpose, in the annular adapter. The relatively stiff cardboard filter further includes windows which are covered by paint pervious screening material so that the paint is filtered in the process of inserting the strainer into the paint can.

BRIEF DESCRIPTION OF THE DRAWINGS

These and other features, aspects, and advantages of the present invention will become better understood with regard to the following description, appended claims, and accompanying drawings where:

FIG. 4 is a vertical section taken generally through a third embodiment of the invention.

FIG. 5 is a view similar to FIG. 4, but illustrating the various components of the invention in exploded relationship to one another and to the paint can into which the device is inserted.

DETAILED DESCRIPTION OF THE PREFERRED EMBODIMENT

Figure 1:
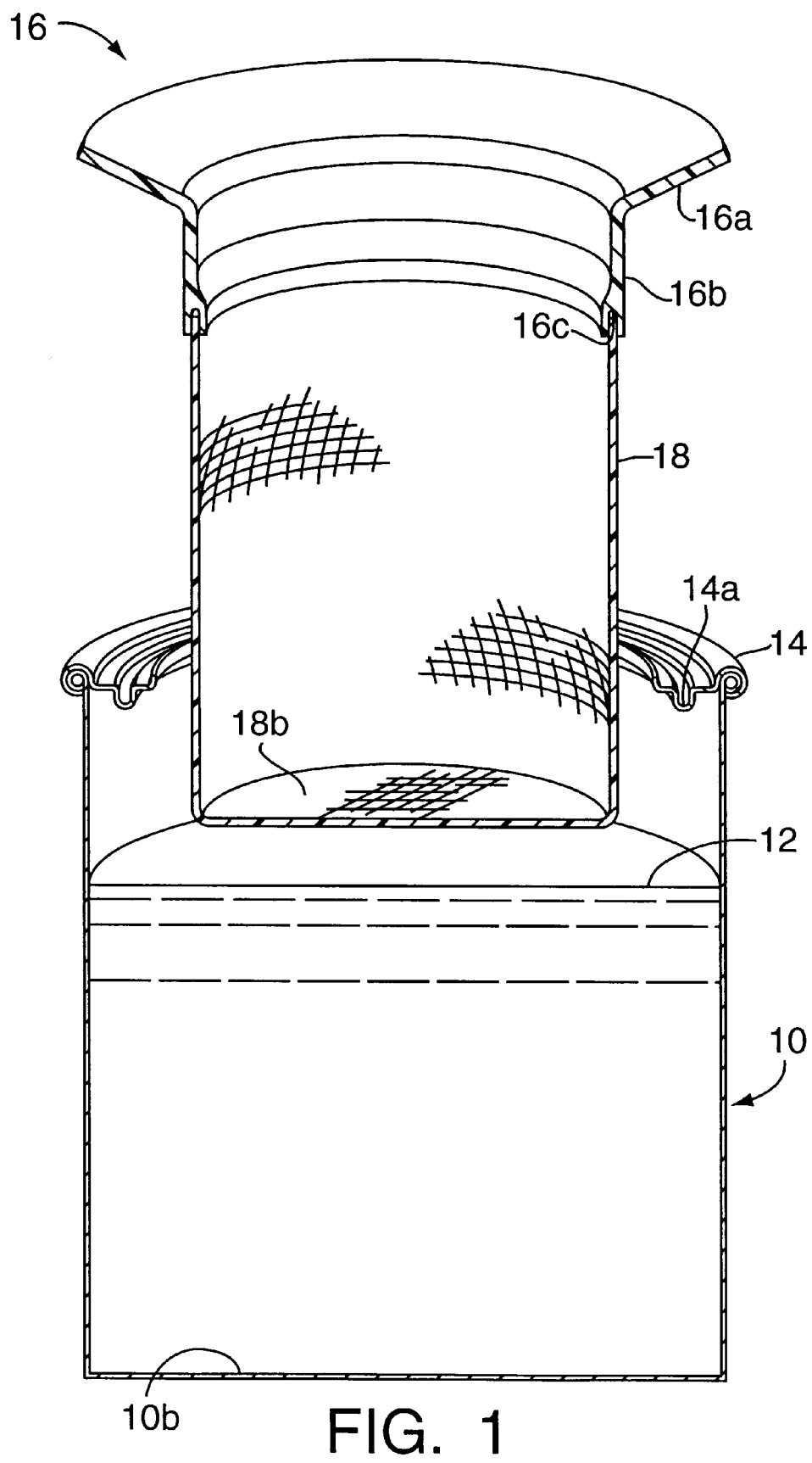
FIG. 1 is an exploded view showing a conventional paint can partially full of paint, and a strainer of the present invention in the process of being inserted into the partially full paint can, both the paint can and the strainer being shown in section.

Turning now to the drawings in greater detail, and referring more specifically to the embodiment of FIG. 1, a conventional paint can 10 is partially filled with paint, as indicated generally at 12, so as to present the painter with the problem solved with the present invention. Upon opening the can, he finds a skin of hardened paint which interferes with his use of the remainder of the paint in the can, particularly after a long period of disuse. The partially open paint can 10 is opened, by conventionally removing the lid, and any skin of hardened paint might preferably be removed. The paint can 10 includes a conventional paint can rim 14 having an annular groove 14a for receiving a correspondingly and complementary shaped annular rib on the lid (not shown) when the can is covered.

Typically, during initial use of the paint can, one will have spilled some paint into this groove 14a with the result that the lid no longer fits tightly enough to prevent air from entering the can, and consequently forming the above-mentioned dried paint skin on the top of the fluid paint in the can. The present invention relates to an improvement which will allow the painter to make better use of the paint remaining in the can after he has attempted to remove the hardened skin from the surface of the paint in the reopened paint can.

More particularly, the strainer of the present invention is shown in FIG. 1 in the process of being inserted into the partially filled paint can. The strainer includes an annularly shaped steel or plastic adaptor 16. The adapter 16 includes a generally outwardly extending radial flange portion 16a, as well as a depending flange portion 16b. The depending annular flange 16b defines a downwardly open annular groove 16c that is adapted to receive the upper marginal edge of a disposable filter material that may be of celluosic reclaimed paper. The thickness of the cardboard filter 18 is sufficient to withstand the stresses imposed upon it in connection with inserting the filter into the liquid paint, as suggested in FIG. 1.

While the filter of cardboard, or paper, 18 may, itself, be pervious to the paint contained in the can, my presently preferred method of constructing the filter 18 provides for windows (not shown in FIG. 1) in the cylindrical sidewalls of the filter 18 and preferably in the bottom wall also. See FIG. 3 where such a filter configuration is illustrated.

As so constructed and arranged, the strainer is adapted to be inserted into the upwardly open, partially filled, paint can, as suggested in FIG. 1, with the result that the paint will be strained as it flows from the can into the interior of the upwardly open strainer. Ultimately, the radially outwardly projecting rim 16a will be supported on the rim 14a of the paint can, and the bottom wall 18b of the filter 18 will be in close proximity to the bottom wall 10b of the paint can.

Figure 3:
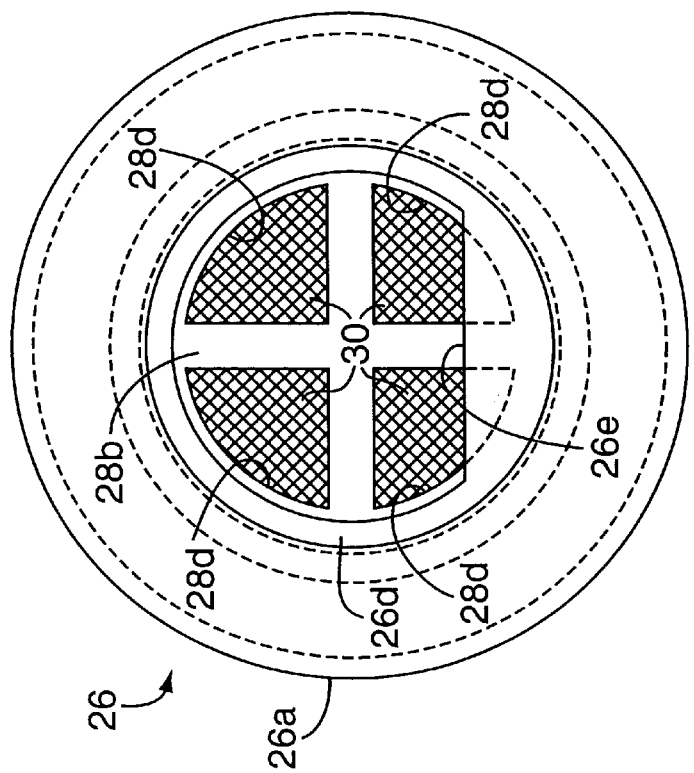
FIG. 3 is a top plan view of the paint can and strainer of FIG. 2.
Figure 2:
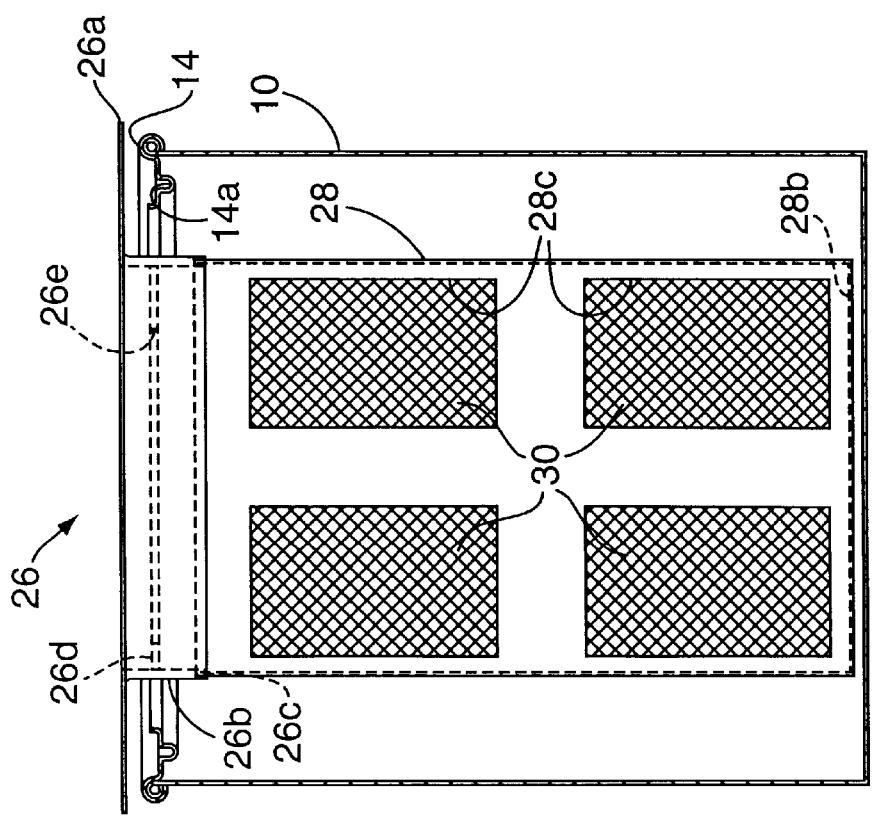
FIG. 2 is a view of an alternative embodiment of the present invention illustrating a paint can, in section, together with a strainer inserted into the paint can in accordance with the present invention.

Turning now to a description of the embodiment illustrated in FIGS. 2 and 3, the paint can 10 is shown to have an upper rim 14 defining an annular groove 14a which is covered by a radially outwardly extending flange 26a of an adaptor 26 that is similar to the adaptor 16, described previously, but which has some differences to be described.

The adaptor 26 defines a depending annular flange 26b having a downwardly open groove 26c defined in its lower marginal edge. The adaptor 26 further includes an inner marginal edge 26d that is generally circular in configuration, but which includes a straight segment or chord edge 26e for use in wiping the paintbrush during use of the strainer of the present invention.

Whereas the adaptor 16 of the previous embodiment was fabricated from an injection-molded polymeric material, the adaptor 26 of the embodiment illustrated in FIGS. 2 and 3 may be fabricated from metal, such as steel. The adaptor 26 is otherwise similar to the adaptor 16 of the previous embodiment, and does include the previously described features. The filter 28 of FIGS. 2 and 3 is similar to the filter 18 of FIG. 1 in that it has an upper marginal edge received in the slot 26c provided for this purpose in the flange 26b of the adaptor 26, and is fabricated from a material, such as celluosic cardboard, which can be readily disposed of by the user in order to replace the filter element in the reusable adaptor 26 of FIGS. 2 and 3.

The filter 28 further includes generally rectangularly-shaped windows 28c, which windows are covered with a paint pervious screen material 30. Windows 28d are also provided in the bottom wall 28b of the filter 28, as best shown in FIG. 3.

Turning next to a detailed description of FIGS. 3 and 4, a conventional paint can 10 is fitted with an annularly shaped polymeric adaptor 116 having certain similarities to the adaptor 16 described previously. More particularly, the adaptor 116 includes a radially outwardly inclined lip 116a, which lip is different from that described previously, in that a downwardly open recess 116b is provided for gripping the annular rim 10b of the paint can 10 to hold the adaptor in place.

The adaptor 116 further includes an integrally defined spout portion 116d that extends part way around the periphery of the adaptor so as to afford a convenient means for pouring the contents of the paint can 10 out of the can 10 into an alternative container (not shown).

Still with reference to the annular adaptor 116, the depending annular flange 116d is provided with a downwardly open groove hat is adapted to receive the upper edge portion 118a of the celluosic filter material, which is indicated generally at 118 in these views. The polymeric plastic adaptor 116 has a straight edge 116b formed across the opening in the annular adaptor 116 that serves as a wiping edge for the paintbrush, all as described previously with reference to the second embodiment of FIGS. 2 and 3.

Finally, and still with reference to the version of FIGS. 4 and 5, it will be apparent that the filter 118 is preferably formed as a separate part from the adaptor 116 so that the filter can preferably be fabricated from a throwaway material, such as celluosic fiber or paperboard, so as to have a relatively still frame portion defining windows 118c in both the cylindrical sidewall of the filter and in the bottom wall (not shown), all as described previously with reference to the filter 28 of FIGS. 2 and 3.

Although three embodiments are described in connection with this disclosure, it should be noted that other variations of the invention will occur to those skilled in the art. For example, the filter 28 may, itself, be reusable even as is true of the adapters described with reference to the three embodiments disclosed herein. For example, the filter 28 of FIGS. 2 and 3, and that of FIGS. 4 and 5, might also be of molded polymeric material so as to define both the frame portion, and the screen material provided in the windows. A polymeric filter material might also be reused, or might instead be disposable in accordance with present-day practices for recyclable plastics generally. Also within the purview of the present invention, one might conceive of other variations in the material of the filter 28 as, for example, is suggested in FIG. 1, wherein the filter 18 may be molded from a filtering material such as might conveniently be formed by a hot-stamping operation from an initially flat sheet of paint pervious polymeric plastic material. Furthermore, the downwardly open slot provided in the adaptor 16 might instead be provided on such a polymeric filter material with the result that the downwardly depending annular flange of the adaptor could be so formed as to be received in an upwardly open slot provided for this purpose in the upper marginal edge of the filter.

While preferred embodiments have been shown and described, various modifications and substitutions may be made without departing from the spirit and scope of the invention. Accordingly, it is to be understood that the present invention has been described by way of example, and not by limitation.

Having thus described my invention, what is claimed is:

1. A paint strainer for use with a paint can having an annular rim defining a groove, said strainer comprising:

an adaptor having an annular upper rim of outside diameter at least equivalent to that of the paint can rim, and having a depending annular flange defining the inside of said adaptor rim, said annular flange fitting inside the paint can rim;

an upwardly open paint straining filter, said filter having a generally cylindrical sidewall and a bottom wall, and said filter further including an annular upper edge releasably received by said depending annular flange of said adaptor; said adaptor depending flange and said filter annular upper edge cooperating with one another such that one of these elements defines a slit on to which the other element is removably received to facilitate replacement of said filter.

said filter further including a paint pervious sidewall and bottom wall portion so that the strainer can be inserted into the paint can when the can is partially filled in order to strain the paint inside the can and provide filtered paint inside the upwardly open adaptor and filter.

2. The paint strainer of claim 1, wherein said depending flange of said adaptor defines a downwardly open slot for releasably receiving the upper marginal edge of said filter, said filter being fabricated from a celluosic material of sufficient stiffness to maintain its cylindrical shape during insertion of the strainer and filter into the paint.

3. The paint strainer of claim 2, wherein said cylindrically-shaped celluosic material has windows cut in said sidewalls and said bottom wall, and a paint pervious covering said windows.

4. The paint strainer of claim 2, wherein said annular slotting and said depending annular adaptor flange snugly receives said upper annular edge of said celluosic material.

5. The paint strainer of claim 2, wherein said adaptor is of molded polymeric, said celluosic material being removable and disposable so that said adaptor can be fitted with a replacement filter.

6. The paint strainer of claim 2, wherein said adaptor upper rim covers the groove in the paint can thereby avoiding the tendency for liquid paint to accumulate in this groove during use of the paint strainer.

7. The paint strainer of claim 2, wherein said adaptor has an inner shape that is circular in part, and that is further defined by a chord of said circular part for use in wiping the paintbrush during use of the paint can and strainer.

* * * * *

UNITED STATES PATENT AND TRADEMARK OFFICE
CERTIFICATE OF CORRECTION

PATENT NO. : 5,935,435
DATED : August 10, 1999
INVENTOR(S) : James J. Hasler

It is certified that error appears in the above-indentified patent and that said Letters Patent is hereby corrected as shown below:

In Column 3, line 15, "FIGS. 3 and 4 should be "FIGS. 4 and 5",

In Column 3, line 26, "116d" should be "116c",

In Column 3, line 35, "116b" should be "116e".

Signed and Sealed this

Sixteenth Day of May, 2000

Attest:

Q. TODD DICKINSON

Attesting Officer       Director of Patents and Trademarks